No. 815,037. PATENTED MAR. 13, 1906.
A. PHILIPPOTEAUX.
APPARATUS FOR MAKING GLASS BOTTLES AND THE LIKE.
APPLICATION FILED MAY 18, 1903.
8 SHEETS—SHEET 1.
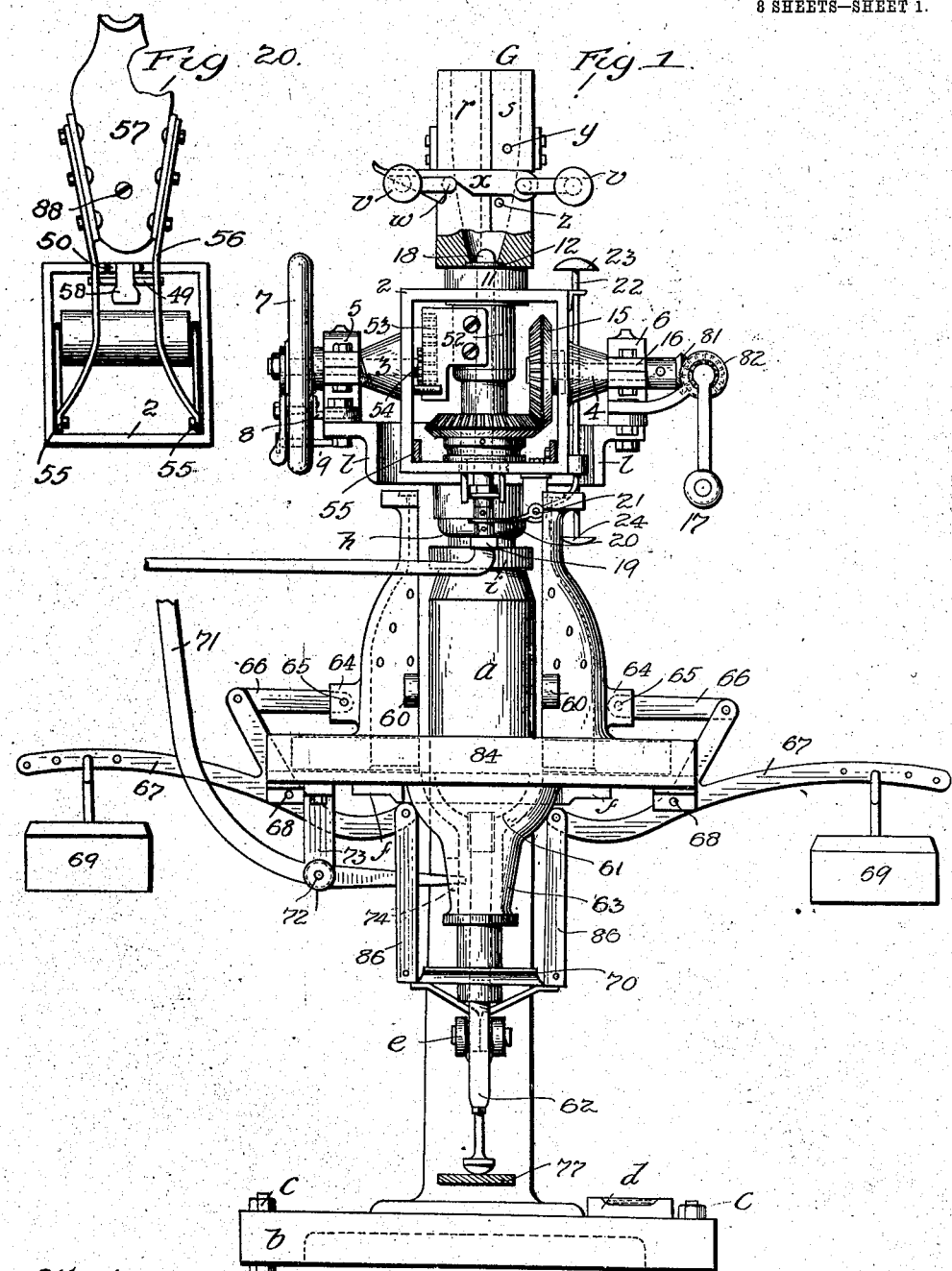
Attest:
C. S. Middleton
J. H. McKuhn
Inventor
Albert Philippoteaux
by Richards
Att'ys.

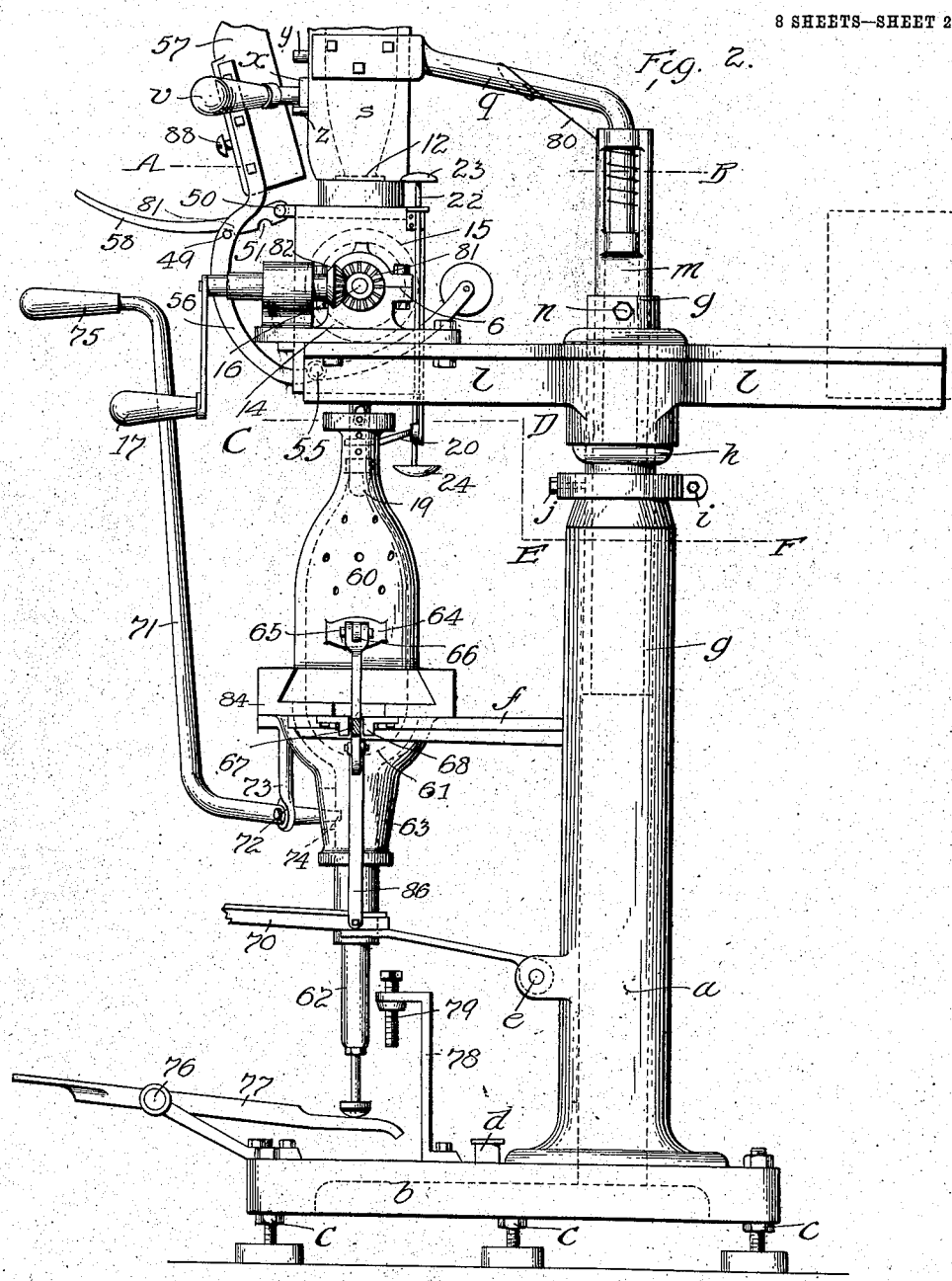

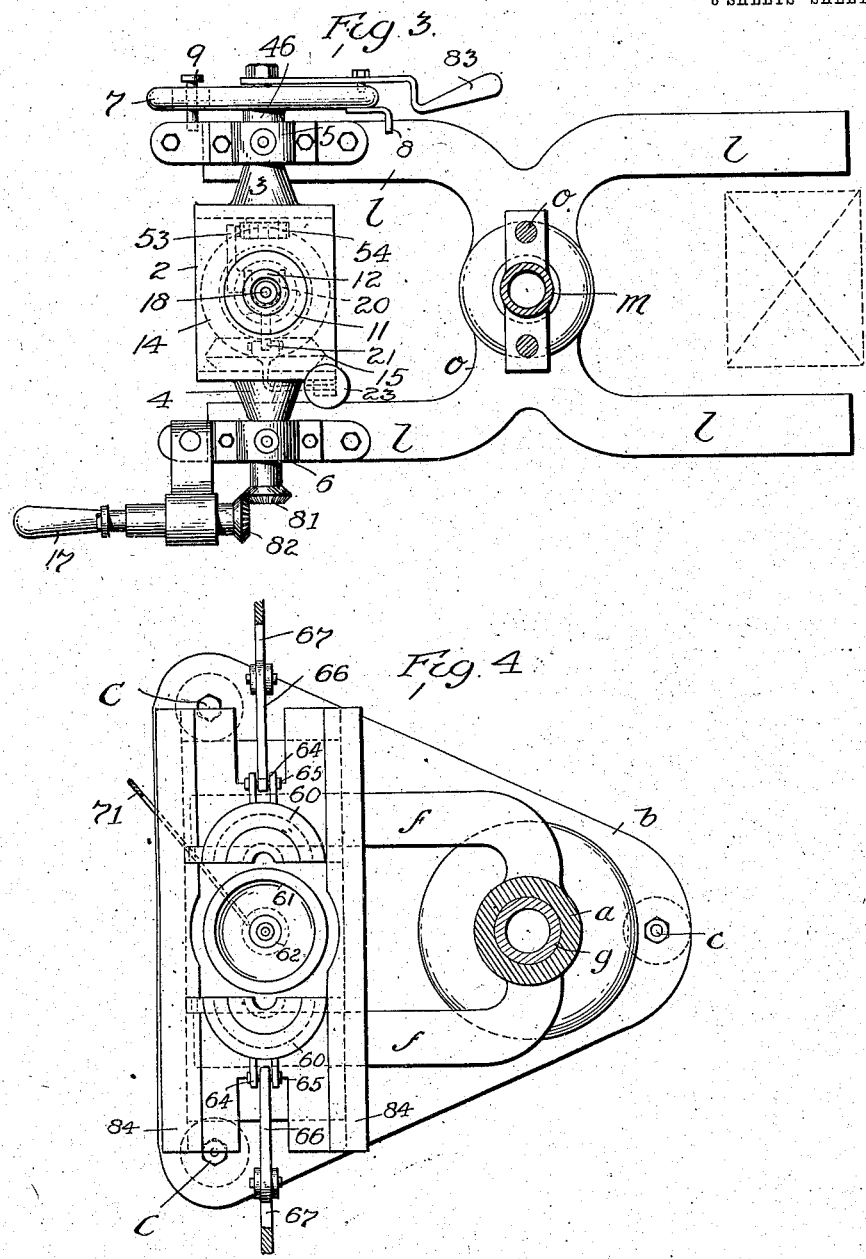

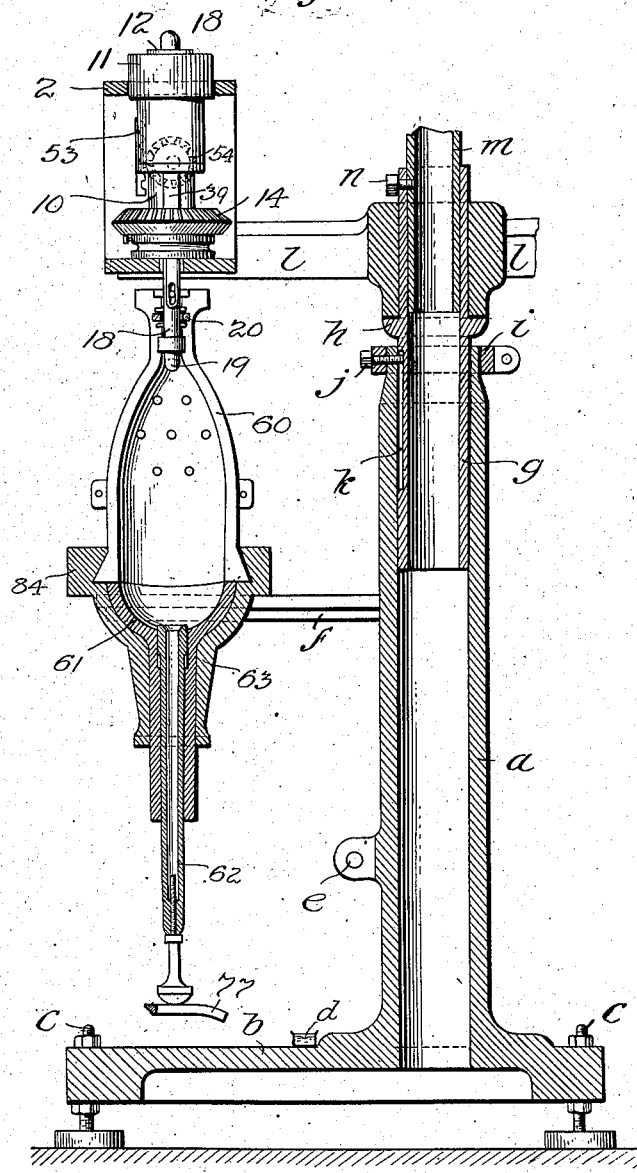

No. 815,037. PATENTED MAR. 13, 1906.
A. PHILIPPOTEAUX.
APPARATUS FOR MAKING GLASS BOTTLES AND THE LIKE.
APPLICATION FILED MAY 18, 1903.
8 SHEETS—SHEET 5.
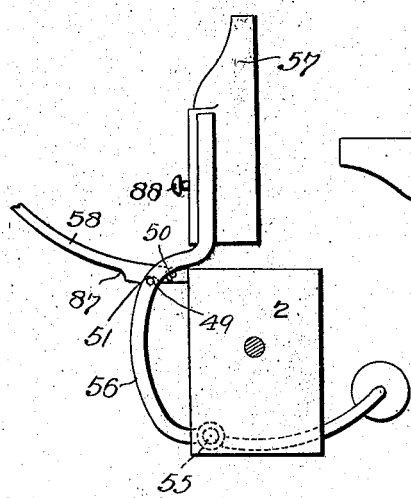
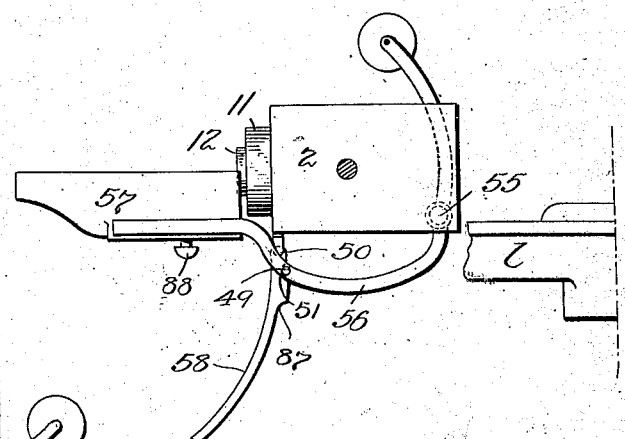
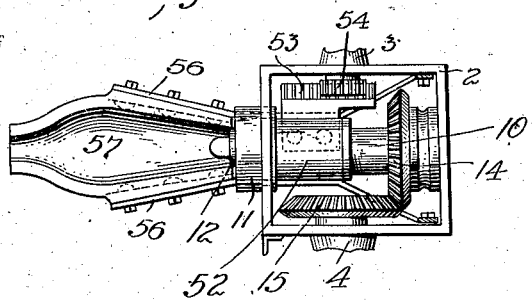
Attest:
C. S. Middleton
H. M. Kuchne
Inventor.
Albert Philippoteaux
by Richardson
Atty's No. 815,037. PATENTED MAR. 13, 1906.
A. PHILIPPOTEAUX.
APPARATUS FOR MAKING GLASS BOTTLES AND THE LIKE.
APPLICATION FILED MAY 18, 1903.
8 SHEETS—SHEET 6.
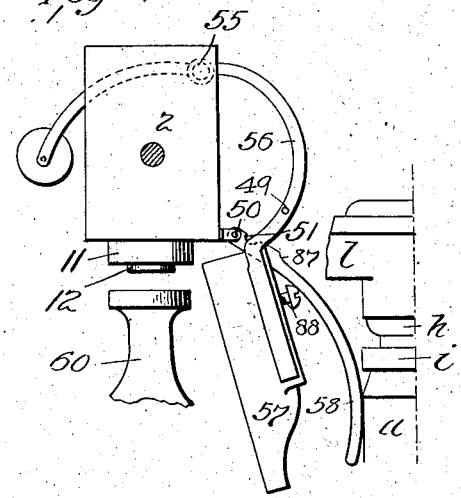
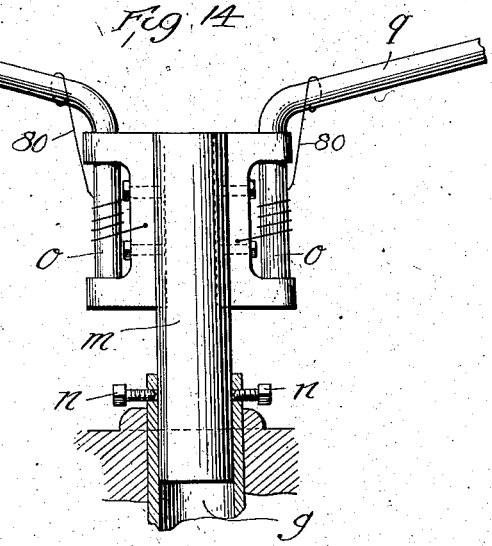
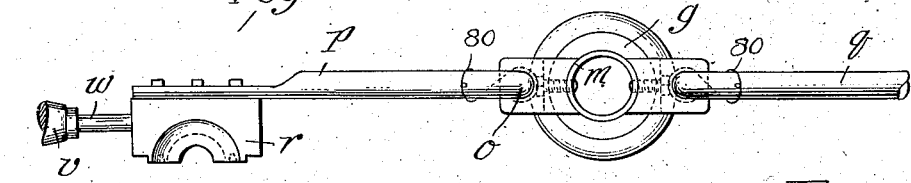
Attest:
C. S. Middleton
W. McKechnie
Inventor
Albert Philippoteaux
By Richards
Attys

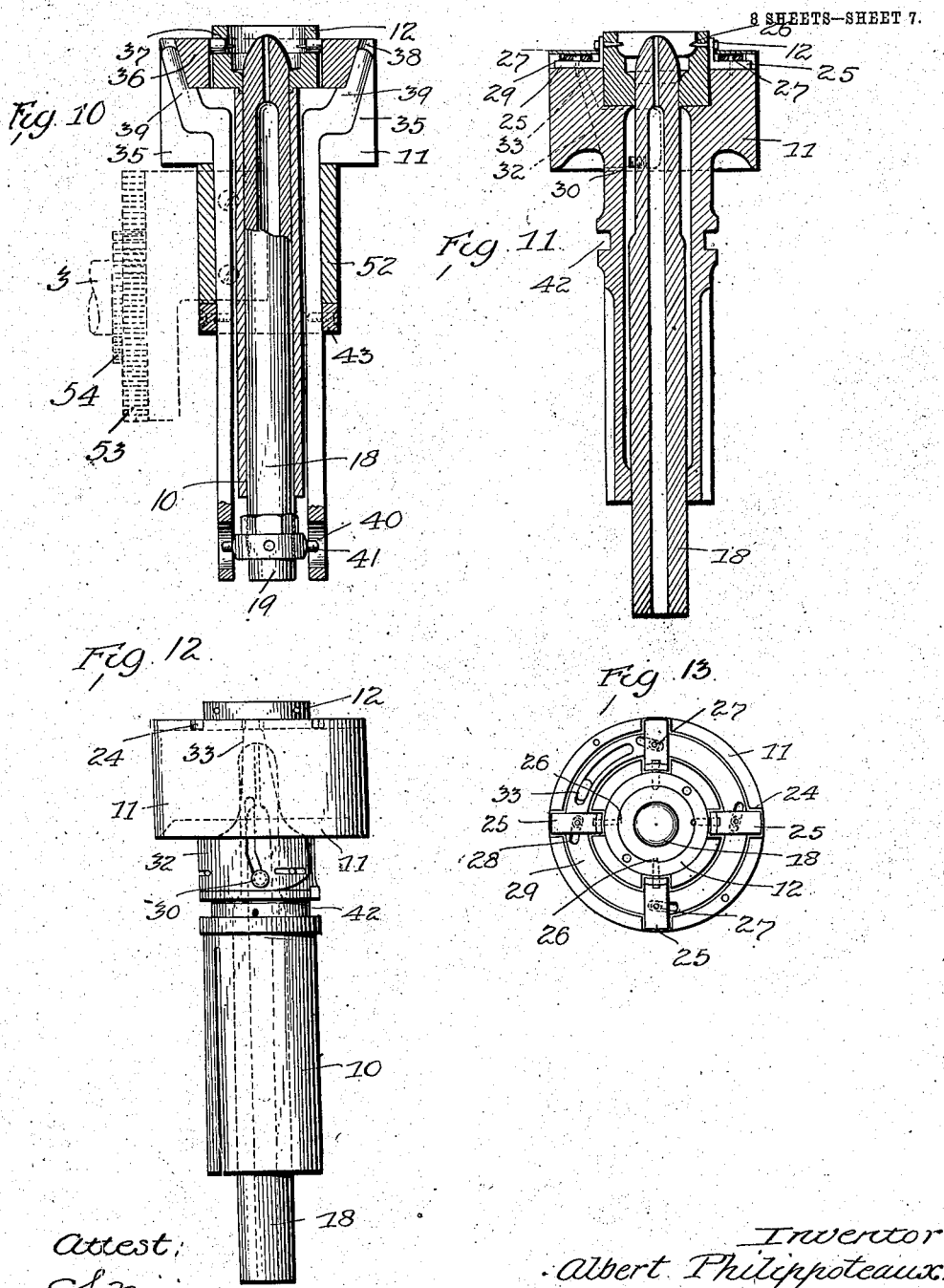

No. 815,037. PATENTED MAR. 13, 1906.
A. PHILIPPOTEAUX.
APPARATUS FOR MAKING GLASS BOTTLES AND THE LIKE.
APPLICATION FILED MAY 18, 1903.
8 SHEETS—SHEET 8.
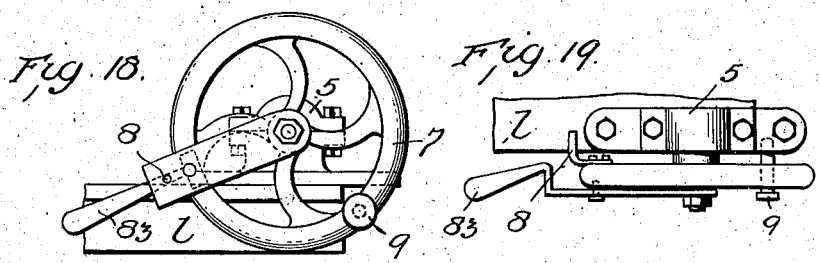
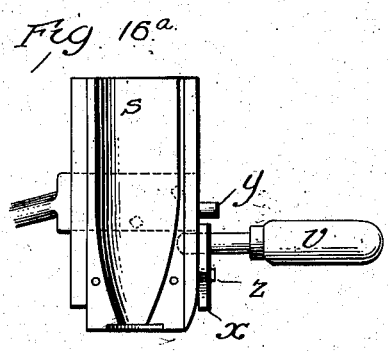
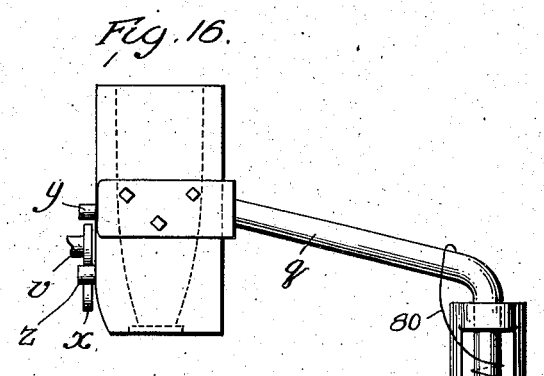
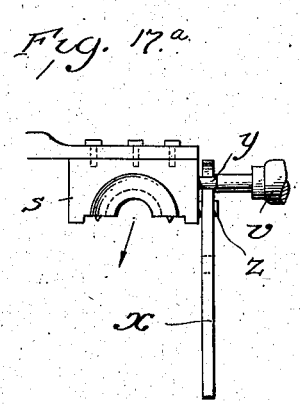
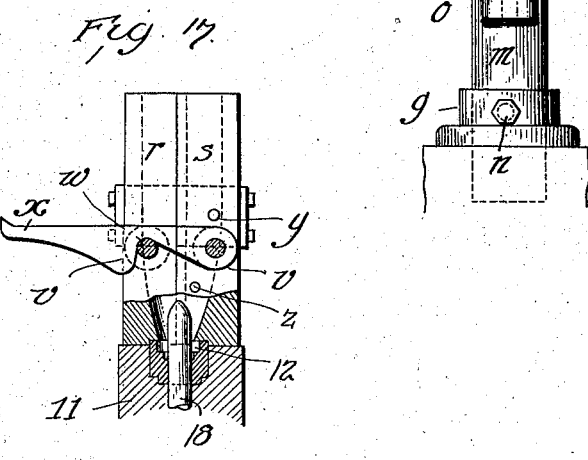
Attest:
C. S. Middleton
H. M. Kuchul
Inventor.
Albert Philippoteaux
By Richards
Atty

UNITED STATES PATENT OFFICE.

ALBERT PHILIPPOTEAUX, OF RHEIMS, FRANCE.

APPARATUS FOR MAKING GLASS BOTTLES AND THE LIKE.

No. 815,037. Specification of Letters Patent. Patented March 13, 1906.

Application filed May 18, 1903. Serial No. 157,622.

*To all whom it may concern:*

Be it known that I, ALBERT PHILIPPOTEAUX, of No. 6 Rue des Poissonniers, Rheims, Marne, in the Republic of France, have invented certain new and useful Improvements in Apparatus for Making Glass Bottles and the Like; and I do hereby declare the following to be a full, clear, and exact description of the invention, such as will enable others skilled in the art to which it appertains to make and use the same.

This invention relates to a machine intended for the manufacture of glass bottles and the like.

The invention is shown in detail in the accompanying drawings, in which—

Figure 1 is an elevation of the whole apparatus, showing the parts in the position which they occupy at the moment when the glass is poured into the upper mold, a portion of the machine being supposed to be removed and shown in Fig. 20. Fig. 2 is a corresponding side view, the upper mold removed in Fig. 20 being shown in place. Fig. 3 is a partial horizontal section on the line A B of Fig. 2, the parts being still in the first position. Fig. 4 is a section on the line C D E F of Fig. 2; Fig. 5, a partial vertical section on the line G H of Fig. 1; Fig. 6, a lateral elevation of the upper mold brought into the second position for taking the unfinished glass body. Fig. 7 is a lateral elevation of the upper mold brought into the third position—that is to say, in which the unfinished glass body is worked. Fig. 8 is a partial plan view of the machine in this same position; Fig. 9, a lateral elevation of the block in the fourth position—that is to say, in the position which it occupies to enable the unfinished glass body to be taken by the lower mold. Fig. 10 is a vertical section of a detail, on an enlarged scale, of the principal member of the device for retaining and conveying the unfinished glass body. Figs. 11, 12, and 13 represent, respectively, a longitudinal section, an elevation, and a plan view, of a modification of the arrangement. Figs. 14 and 15 represent, respectively, a front elevation and plan view of the upper mold opened. Figs. 16 and 17 are respectively a lateral elevation and a sectional elevation of the same mold closed. Figs. 16ª and 17ª are detail views of the mold. Figs. 18 and 19 are respectively an elevation and plan view of the wheel 7 serving for rocking the mechanism for conveying the unfinished glass body into the first position and the lever 83 serving to produce at will the elongation of the neck of the bottle. Fig. 20 is a view of the block removed from Fig. 1.

The frame of the machine is composed of a column $a$, mounted on a bed-plate $b$, three regulating pins or screws $c$ serving for leveling this frame by means of a spirit or water level $d$, fixed on the bed-plate $b$. A tubular support $g$ is incased by and adapted to slide in the column $a$, the position of said support being adjustable. This support being held by means of a collar $i$ is prevented from turning by a screw $j$, Figs. 2 and 5, engaged in a vertical groove $k$ of the tube $g$. This tubular support forms the axis on which a platform $l$ may turn, said platform carrying the apparatus for conveying and working the glass body. This platform is supported on a collar $h$, formed by an enlargement or shoulder on $g$.

A socket or bush $m$, Figs. 2, 3, 5, 14, and 16, sliding in the column $g$ and the position of which is adapted to be regulated by stop-screws $n$, forms a support by means of two projecting brackets for two vertical pivots $o$, on which two arms $p$ and $q$ turn like the two arms of a hinge. At the upper end of these arms the two halves $r$ and $s$ of the upper mold are fixed, the capacity of said mold being such as to receive the quantity of glass necessary for the formation of the bottle and said mold having various characteristics. Its internal walls terminate at the lower part in two half-annular recesses, which when the mold is closed fit exactly over a ring 12, Fig. 17, of the device for retaining the unfinished glass body. The fastening of the mold for holding it in the closed position is done automatically by means of handles $v$ on each of the two half-molds, which handles are caused to approach to one another. On one of the two molds there is for this object a latch $x$ pivoted on the rod of one of the handles $v$, the movements of said latch being limited by two studs $y$ and $z$, projecting from the same face of the mold. The other half-mold $r$ has a projection $w$, which may also be formed by the rod of the corresponding handle and on which the beak of the latch slides in order to automatically engage therewith. In order to open the mold, it suffices to slightly raise the end of the beak of the latch. The opening of the mold thus unbolted is there done automatically under the action of springs 80, wound round the spindles $o$ and having their extremities fixed, respectively, on the arms *p* and *q* and on the brackets for supporting the spindles *o*. This return device may be replaced by a counterweight suspended on a chain and running over two pulleys. The upper mold thus constructed receives glass metal collected by the blowpipe only when it has been brought into operative relation with the device for retaining the collar and conveying the glass body, and this member is shown on an enlarged scale in Fig. 10. It completes the upper mold when it is brought for this purpose into a vertical position with the ring 12 on the top, Fig. 1.

The device for conveying and retaining is constituted by a frame 2, provided with trunnions 3 and 4, resting on two bearings 5 and 6, fixed on the part *l* of the frame. On one of these trunnions 3, which is prolonged, a fly-wheel 7 is keyed, while two stops 8 and 9, fixed on this fly-wheel, Figs. 18 and 19, serve to maintain the whole in position by striking above and beneath the part *l* of the frame *a*—namely, the one 8 serving to maintain the frame in the vertical position necessary for fitting the two half-collars of the upper mold on the ring 12 and the other in a reverse vertical position, so that the glass body may be blown in the final mold. In the axis of the part 2 a hollow shaft 10 is located, terminated at one of its ends by a socket 11. On this shaft 10 a pinion 14 is keyed, which pinion gears with a pinion 15, keyed in turn on a shaft 16, passing through the trunnion 4. A crank 17, operating a pinion 82, enables a pinion 81, keyed on the shaft 16, to be revolved, and thus by the intermediate wheels 15 and 14 to cause the shaft 10 to revolve in the frame 2 whatever may be the position of the latter.

In the center of the socket or bush 11 a neck-mold or collar 12 is arranged for receiving the quantity of glass necessary for making the neck of the bottle, said neck-mold being able to be changed at will, according to the kind of bottle to be made.

A mandrel 18, bored with a passage and connected at its lower part at 19 with a blowing means, Fig. 1, may slide freely in the shaft 10. The end of this mandrel enters the neck of the mold 12, and when the glass is poured into the mold the mandrel must be raised a certain distance, as indicated in Fig. 17, in order to form the mouth and a portion of the internal part of the neck of the bottle. Further, by thus pressing into the full mold it presses the glass strongly against the walls of said neck-mold, and thus molds perfectly the external face of this part of the bottle. For this object the mandrel is connected with a lever 20, Figs. 1 and 2, pivoted at 21 on the part 2, a rod 22, guided in the part 2 and provided at its ends with studs 23 and 24 and connected with the lever 20, enabling the mandrel 18 to be projected and then to be returned to its initial position.

The socket 11 carries the parts serving for retaining the glass and for this object penetrates into the neck-mold 12, said parts being of two kinds working differently according to the nature of the bottles. In the example shown in Figs. 11, 12, and 13 the socket or bush 11 has at its front face four grooves 24, serving as slides for four square slide-pieces 25; but the number of these grooves, and consequently that of these slide-pieces, may be varied. They are each provided at their upper inner part with a point 26 of conical form, engaging in a corresponding cavity formed in the neck-mold 12. When these points pass in their entering movement the internal circumference of the neck-mold, they embed themselves in the pasty glass. Each slide-piece has in its center a screw 27, the head of which engages in a slot 28 of a washer 29, and said washer in turning pushes the four slide-pieces toward the center of the neck-mold, thus causing the four points 26 to project. The mandrel 18 carries a screw 30, the head of which engages in a projection formed in a part 32, terminated at its extremity in a tapered part 33, Fig. 11, resting in a slot 34 of the washer 29, with the object of actuating this washer. The mandrel in entering this device causes it to operate and in withdrawing returns it to its initial position, thus releasing the points 26.

In the modification shown in Fig. 10 the socket 11 has on its front face two dovetail notches 35, and in these notches are two slide-faces 36, on which two points 37 are screwed, the said points entering the neck-mold 12. An oblique notch 38 runs through these pieces, and two pushers 39, located in the thick part of the socket 11 on the hollow shaft 10, in entering and retiring from the notch 38 cause these slides to move, while the movement is limited by the pieces of these pushers. These pushers are terminated at their lower end by an eyelet 40. In these eyelets two nipples 41, screwed on the mandrel, engage, the pushers being carried along n the movement of the mandrel when the latter is set in motion.

The hollow shaft 10 has a device for retaining and conveying the glass body and must be able to rise and descend at will to the extent necessary for releasing the part of the bottle engaged in the neck-mold and eventually elongating the neck. The mode of its actuation will vary according as the means shown in Figs. 11, 12, and 13 or the one shown in Fig. 12 be employed. In the first case it is actuated by means of a fork engaging the neck 42.

In the drawings of the whole apparatus the application of the form to Fig. 10 is shown. In this case the operation is effected by a ring 52, surrounding the shaft 10, and maintained by a second ring 43, fixed on said shaft. The ring 52 has a rack 53, with which the teeth of a pinion 54, keyed on a trunnion-shaft 3, engage. A lever 83, Figs. 1, 18, and 19, keyed on the other extremity of this shaft, enables the desired movement of the hollow shaft 10 to be obtained.

On the part 2 two arms 56 are pivoted at 55, Figs. 2, 6, 7, 9, and 20, between which arms a block 57, serving for working the glass, is bolted, the internal walls of this block terminating in a half-neck intended to fit exactly over the mold 12 of the conveying and retaining device and the edges of which form a slight projection, Fig. 8, molding the lower part of the neck of the bottle. This block may be pivoted to separate and to approach at will in order to give passage sometimes to the upper mold, sometimes to the final mold. A lever 58, pivoted at 50 on the frame 2, may engage, by means of a notch 51 on a cross-bar 49, for the tilting of the block 57 and its maintenance in the position of Figs. 6 and 7. In the reversal of the conveying and retaining arrangement the lever 58 strikes the frame $a$ of the machine, Fig. 9, and operates automatically the disengagement and consequently the effacement of the block.

The platform $l$ of the frame, Fig. 3, is formed of two symmetrical parts, one of which supports, as has just been explained, all the special means for conveying and retaining the unfinished glass body. The symmetrical part may carry an absolutely identical arrangement, the use of which is indicated in dotted lines, thus enabling one or other of these two devices to be employed alternately, causing the part $l$ to turn on its axis $g$. Owing to this the scaffolding which is employed when working with a single part is dispensed with, and thus means for cooling, which are always complicated and delicate, may also be dealt with.

The final mold is placed on a support $f$, Figs. 1, 2, 4, and 5, formed by two arms forming one with the frame $a$. This mold is formed of a table 84, in the whole length of which a dovetail slide is provided, and in this slide two arms 60, forming the upper part of the mold, travel, while a socket 63, in which the bottom of the mold 61 is placed, is carried at the center of the table. In the axis of this bottom 61 a spindle 62, intended to form the hollow bottom of the bottle, engages. The arms 60 each carry externally lugs serving to support a pivot 65 of a rod 66, connected by its other extremity to one of the two arms of a lever 67, pivoting at 68 on a lug screwed to the lower and lateral part of the table 84. The end of the other arm of this lever is perforated with several holes for the suspension of a counterweight 69, and a pedal 70, pivoted at $e$ to the frame $a$, is connected to the lower end of each of these levers 67 by rods 86, the arms 60 being caused to approach one another by pressing on said pedal, while if the pedal be released the arms separate automatically under the action of the counterweights 69.

A lever 71 is pivoted at 72 on a cheek 73, fixed to the table 84, and its end engages in an aperture 74, formed in the socket 63 and in the bottom 61 of the mold, the said lever terminating in a handle 75 and serving for raising or lowering the bottom of the mold in order to sustain the glass body which is being elongated therein.

A lever 77, forming the pedal and the end of which causes a spindle 62, intended to indent the hollow bottom of the bottle, is pivoted on a bracket 76, carried by a cheek fixed on the socket $b$, a catch formed by a screw 79, carried by a support 78, fixed to the socket $b$, enabling the movement of this lever to be regulated at will.

The process of making a bottle with the machine hereinbefore described is as follows: The upper mold being open, the fly-wheel 7 is arranged in such a way that its stop 8 bears upon the part $l$ of the frame $a$. At this moment the part 2, which previously was in the position shown in Fig. 2 and, by means of a cross-bar 49, engaged the notch 87 of the lever 58, is placed vertically. The half-molds $r$ and $s$, which constitute the upper mold covered by the mold 12, are caused to approach to one another, and the complete cavity of the mold intended to receive the molten glass is thus constituted by the parts $r$ and $s$; the walls of the mold 12, and the surface of the upper part of the mandrel 18. When the glass has thus been collected and limited within the mold, the mandrel 18 is pushed in, Fig. 17, thus molding the glass against the walls of the mold, and then by the aid of the blowing means the glass body is expanded or blown. The upper mold is then opened by simply raising the latch $x$, the two half-molds separate automatically, and the glass body is simply retained by the mold 12 and the points 26. The block 57 is caused to advance by means of the lever 58, Fig. 6, then about a quarter of a revolution is given to the fly-wheel 7, Fig. 18, and the whole block and frame 2 is brought into a horizontal position, Figs. 7 and 8. By means of the crank 17 the shaft 10 is revolved, which, owing to the points 26, carries with it the glass body. The latter therefore turns in the block 57 and is elongated, while by means of the blowing device the necessary form is given to it. The work in the block being terminated another quarter-revolution is given to the fly-wheel 7, so as to bring the frame 2 and the block into the vertical reversed position, Fig. 9, and during this operation the lever 58, striking the frame $a$, releases the block 57, which has now become useless, and the latter moves away by its own weight or under the action of a counterweight, if the latter is necessary. The glass body is thus freely suspended, held by the mold 12 and the points 26, and then the bottom of the mold 61, raised by means of the lever 71, sustains the glass body during its elongation. When the bottom 61 of the mold is returned to its initial position located in the socket 63 of the table 84, the glass body is of the desired dimensions. By pressing with one foot on the pedal 70 the arms of the mold are approached to one another, and thus the glass body is imprisoned in the final mold. The crank 17 is then again operated so as to cause the glass body to turn, while the necessary air is admitted by the mandrel 18. When the moment appears propitious, the hollow bottom or kick 3 formed by means of the spindle 62 by the levers 77 being actuated, on which the heel is pressed, the point of the toe continuing to act on the pedal 70. The bottle is then finished. In order to remove it from the mold, the mandrel 18 is withdrawn, which itself withdraws the points 26, and the arms 60 are allowed to separate of themselves, and the hollow shaft 10 is again raised by means of the lever 83, thus releasing the upper part of the bottle, which may then be removed completely finished. By giving to the fly-wheel 7 a reverse movement to the one hereinbefore mentioned the whole device is returned to its initial position, and then making the part $l$ revolve on the axis $g$ the device for conveying and symmetrically retaining the glass body is brought back into the position for working, these parts having had time to lose a portion of their heat. A fresh operation may then be commenced.

I declare that what I claim is—

1. A machine for manufacturing glass bottles comprising a supporting-column, revoluble glass supporting and blowing means carried thereby, a two-part preliminary mold vertically arranged and adapted to receive the molten glass and coöperate with said supporting and blowing means, a final mold, and means for swinging or rotating the supporting-machine with the partially-formed bottle carried thereby to bring it into operative relation to the final mold, substantially as described.

2. A machine for manufacturing glass bottles, comprising a supporting-column, a two-part separable vertically-disposed preliminary mold carried by said column, a revoluble frame supported from said standard and having means for coöperating with the mouth of the preliminary mold to form the bottle-neck, neck-engaging devices included in said means, means for swinging the revoluble frame after the preliminary mold has been opened to reverse the bottle and a working block or mold adjustable about its axis for further operating upon the bottle, substantially as described.

3. In a machine of the character described, a frame 2, a hollow shaft 10 supported thereby, a mold at one end thereof for forming the neck of the bottle, gripping devices in said mold for retaining the glass, a mandrel 18 for compressing and blowing the glass guided by said hollow shaft, and a block 57 pivoted to the frame for working the glass.

4. In combination, a telescoping standard, brackets carried thereby, vertically-disposed rods journaled in said brackets having outwardly-inclined arms $p$ and $q$, means tending normally to separate said arms, a half-mold carried by each arm, and latch means carried by the half-molds for holding them together, substantially as described.

5. In a bottle-forming machine, means for partially blowing the bottle in an inverted position, means for swinging and rotating it into any desired position, a working device, means for permitting said working device to move in a half-circle so that it may work upon the bottle while held in any position, and a final mold for completing the bottle while in an upright position, substantially as described.

6. In a bottle-forming machine, a final mold, comprising a supporting member 84, a bottom-supporting mold or device carried thereby having a central passage, a bottom-forming spindle working therein, and side-shaping parts 60 removably carried by the member 84, substantially as described.

7. In a device of the class described a neck-mold in one piece having prongs for holding and releasing the bottle, substantially as described.

8. In a device of the class described a neck-mold having prongs for holding and releasing the bottle and a reciprocating shaft for operating the neck-mold, substantially as described.

In witness whereof I have hereunto set my hand in presence of two witnesses.

ALBERT PHILIPPOTEAUX.

Witnesses:
 ISAAC LEENS,
 AUGUST DOME.